United States Patent
Chevalier et al.

(10) Patent No.: US 8,411,704 B2
(45) Date of Patent: Apr. 2, 2013

(54) METHOD, DEVICE AND SYSTEM FOR GENERATING A CONTRIBUTION DATA STREAM

(75) Inventors: Emmanuel Chevalier, Rennes (FR); Ludovic Poulain, Rennes (FR); Benoit Chauviere, Rennes (FR); Patrick Auffray, Rennes (FR)

(73) Assignee: Enensys Technologies, Rennes (FR)

( * ) Notice: Subject to any disclaimer, the term of this patent is extended or adjusted under 35 U.S.C. 154(b) by 20 days.

(21) Appl. No.: 12/676,966

(22) PCT Filed: Aug. 20, 2008

(86) PCT No.: PCT/EP2008/060876
§ 371 (c)(1),
(2), (4) Date: Oct. 12, 2010

(87) PCT Pub. No.: WO2009/030595
PCT Pub. Date: Mar. 12, 2009

(65) Prior Publication Data
US 2011/0038384 A1 Feb. 17, 2011

(30) Foreign Application Priority Data
Sep. 7, 2007 (FR) .................................. 07 06265

(51) Int. Cl.
*H04J 3/06* (2006.01)
(52) U.S. Cl. .................. 370/503; 370/537; 370/474
(58) Field of Classification Search .................. 370/503, 370/537, 535, 474
See application file for complete search history.

(56) References Cited

U.S. PATENT DOCUMENTS
2007/0074267 A1* 3/2007 Clerget et al. ................. 725/136

FOREIGN PATENT DOCUMENTS
EP 1768285 3/2007

OTHER PUBLICATIONS

Preliminary Examination Report on Patentability, for PCT/EP2008/060876, in English language; dated May 14, 2010.
International Search Report for PCT/EP2008/060876, mailed Jul. 9, 2009.
Foreign-language Written Opinion of the International Searching Authority for PCT/EP2008/060876, mailed Jul. 9, 2009.
"Digital Video Broadcasting (DVB); DVB-H Implementation Guidelines; ETSI TR 102 377", ETSI Standards, vol. BC, No. V1.1.1; (Feb. 1, 2005).

(Continued)

*Primary Examiner* — Chandrahas Patel
(74) *Attorney, Agent, or Firm* — Nixon & Vanderhye PC

(57) ABSTRACT

A contribution system where the national services are not duplicated in the single stream. This single stream is transmitted in a mode not implementing burst transmission. Advantageously, the single stream is not protected by an FEC error correcting code, as present in the radio broadcast standard, for example DVB-H. Synchronization is provided by the insertion by the concentrator of synchronization packets comprising three synchronization stamps. A first stamp serves to synchronize the deconcentrators with each other and with the concentrator. A second stamp generates a first synchronization signal allowing synchronous generation of the period of the burst transmission mode necessary for generating the regional signal. The third stamp serves to generate a second synchronization signal for generating so-called "MIP" synchronization packets for synchronizing the various modulators.

11 Claims, 3 Drawing Sheets

OTHER PUBLICATIONS

"Digital Video Broadcasting (DVB); DVB mega-frame for Single Frequency Network (SFN) synchronization; ETSI TS 101 191", ETSI Standards, vol. BC, No. V1.4.1; (Jun. 1, 2004).

May, G.; "Loss-free handover for IP datacast over DVB-H networks", Consumer Electronics, 2005, (Jun. 14, 2005), pp. 203-208.

Zarko, C.E.—Anonymous; "Digital Broadcasting and new Services", Telecommunications in Modern Satellite, Cable and Broadcasting Services S, 2007, (Sep. 1, 2007), pp. 217-229.

* cited by examiner

METHOD, DEVICE AND SYSTEM FOR GENERATING A CONTRIBUTION DATA STREAM

This application is the U.S. national phase of International Application No. PCT/EP2008/060876 filed 20 Aug. 2008, which designated the U.S. and claims priority to FR application Ser. No. 07/06265 filed 7 Sep. 2007, the entire contents of each of which are hereby incorporated by reference.

TECHNICAL FIELD OF THE INVENTION

The present invention concerns a system for the contribution of multiplexed digital services covering a territory consisting of several regions.

BACKGROUND OF THE INVENTION

The broadcast services comprise so-called national services that are to be transmitted to all regions and regional services specific to each region. A single stream is used to transmit the national and regional services. This single stream may, for example, be transmitted via a satellite broadcast. Each region is covered by one or more transmitters called deconcentrators, which receive the single stream transmitted by a single source called a concentrator. This single stream contains all the services. The deconcentrators withdraw from it the national services and the regional services specific to their region in order to form and transmit the so-called regional stream intended to be received by the terminals of the users in the region concerned. The broadcasting can be done for example according to the DVB-H (Digital Video Broadcasting—Handheld) standard defined in the document "ETSI EN 302 304, DVG-H-Transmission System for Handheld Terminals". The broadcasting of services within the same region is done on the same frequency according to a so-called SFN (Single Frequency Network) system. Such broadcasting involves good synchronisation between the various modulators transmitting the stream on the single frequency within the region. Where these modulators are supplied by several deconcentrators, these must also be properly synchronised. Moreover, the bandwidth available on a satellite is limited and expensive.

SUMMARY OF THE INVENTION

The present invention aims to solve the above problems by defining a contribution system where the national services are not duplicated in the single stream. This single stream is transmitted in a mode not implementing burst transmission. Advantageously, the single stream is not protected by an FEC (Forward Error Connection) error correction code as present in the radio broadcast standard, for example DVB-H. Synchronisation is provided by the insertion by the concentrator of synchronisation packets comprising three synchronisation stamps. A first stamp serves to synchronise the deconcentrators with each other and with the concentrator. A second stamp serves to generate a first synchronisation signal for synchronous generation of the period of the burst transmission mode necessary for generating the regional signal. The third stamp serves to generate a second synchronisation signal for generating so-called "MIP" synchronisation packets for synchronising the various modulators.

The contribution system proposed is particularly economical in bandwidth between the concentrator and the deconcentrators because the national services are not duplicated and the stream does not contain any redundant information. It affords good synchronisation between the deconcentrators and the generation by the latter of standard streams, for example DVB-H SFN, synchronised and enabling synchronisation of the various modulators. According to a particular embodiment of the invention, it offers the secondary advantage of allowing easy insertion of additional services by the deconcentrator. The processing carried out by the deconcentrators for generating the regional streams remain simple.

The present invention concerns a method of generating a data stream, referred to as a contribution stream, comprising a multiplex of services and including a step of generating a transport stream consisting of transport packets constructed from sections of the multiplex, said transport stream not being formed in bursts; a step of constructing megaframes within the transport stream, referred to as contribution megaframes, by inserting special so-called synchronisation transport packets for the contribution multiplex comprising a pointer to the first packet of the following contribution megaframe and a time stamp, called MCTS, relating to the moment of sending of the start of the following contribution megaframe; a step of generating a periodic signal called an IPE synchronisation signal, the period corresponding to the time of sending of an integer number of transport packets, a step of generating a periodic signal called the megaframe synchronisation signal; a step of inserting, in the synchronisation packets of the contribution multiplex, a second time stamp called ITS relating to the IPE synchronisation signal and a step of inserting, in the synchronisation packets of the contribution multiplex, a third time stamp called MTS relating to the megaframe synchronisation signal.

According to a particular embodiment of the invention, the transport stream consists of a multiplex, the sections of which are not protected by an error correcting code by the addition of redundant sections.

According to a particular embodiment of the invention, several sets of synchronisation parameters are defined, each set corresponding to an IPE synchronisation signal and to a given megaframe synchronisation signal, ITS and MTS time stamps corresponding to each set are introduced into the contribution megaframes of the stream generated.

According to a particular embodiment of the invention, the ITS and MTS time stamps corresponding to each set of synchronisation parameters are introduced in the form of synchronisation packets of the contribution multiplex different in each contribution megaframe of the stream generated.

According to a particular embodiment of the invention, the ITS and MTS time stamps corresponding to each set of synchronisation parameters are introduced within the same synchronisation packet of the contribution multiplex in each megaframe of the contribution stream generated.

The present invention also concerns a method of generating a data stream comprising a multiplex of services and signalling tables including a step of receiving a contribution stream generated as described previously; a step of synchronisation from the first MCTS time stamp relating to the moment of transmission of the start of the following contribution megaframe of the stream received, included in the synchronisation packets of the contribution multiplex of the stream received; a step of generating a periodic signal called an IPE synchronisation signal from the ITS time stamps included in the synchronisation packets of the contribution multiplex of the stream received; a step of generating a periodic signal called the megaframe synchronisation signal from the MTS time stamps included in the synchronisation packets of the contribution multiplex of the stream received; a step of generating a multiplex of services issuing from the stream received; a step of generating a transport stream from the multiplex generated, formed in bursts, synchronised on the IPE synchronisation signal generated, and a step of constructing megaframes within the transport stream generated, referred to as broadcast megaframes, by the insertion of megaframe initialisation packets synchronised on the megaframe synchronisation signal generated.

According to a particular embodiment of the invention, the method also comprises a step of protecting the multiplex generated by means of a redundancy error correcting code.

According to a particular embodiment of the invention, the step of generating the multiplex includes a step of inserting an additional service not issuing from the stream received.

According to a particular embodiment of the invention, the method is made deterministic by the fact that the step of generating the IPE periods generates periods of fixed size; the burst generation step generates bursts for each PID comprising a number of TS packets that is a multiple of 16 for each IPE period; the burst generation step generates bursts ordered in a deterministic order for each IPE period within the transport stream; the step of generating the SI/PSI tables of the transport stream generated comprises a number of TS packets that is a multiple of 16 for each PID and for each IPE period and by the fact that the method comprises a step of reinitialising the generation of the signalling tables at the start of each IPE period in order to ensure that the transport packets corresponding to the PSI/SI tables are identical and at the same positions for each IPE period.

The present invention also concerns a first type of device for generating a data stream comprising a multiplex of services comprising means of generating a transport stream consisting of transport packets constructed from sections of the multiplex, said transport stream not being formed in bursts; means of constructing megaframes within the transport stream, referred to as contribution megaframes, by inserting special transport packets for synchronisation of the contribution multiplex comprising a pointer to the first packet of the following contribution megaframe and a time stamp, called MCTS, relating to the moment of sending of the start of the following megaframe; means of generating a periodic signal called an IPE synchronisation signal, the period corresponding to the time taken for sending an integer number of transport packets, means of generating a periodic signal called the megaframe synchronisation signal; means of inserting, in the synchronisation packets of the contribution multiplex, a second time stamp called ITS relating to the IPE synchronisation signal and means of inserting, in the synchronisation packets of the contribution multiplex, a third time stamp called MTS relating to the megaframe synchronisation signal.

The present invention also concerns a second type of device for generating a data stream comprising a multiplex of services and signalling tables that comprises means of receiving a stream generated as described previously; means of synchronisation from the first MCTS time stamp relating to the moment of sending the start of the following contribution megaframe included in the synchronisation packets of the contribution multiplex of the stream received; means of generating a periodic signal called the IPE synchronisation signal from the ITS time stamps included in the synchronisation packets of the contribution multiplex of the stream received; means of generating a periodic signal called the megaframe synchronisation signal from the MTS time stamps included in the synchronisation packets of the contribution multiplex of the stream received, means of generating a multiplex of services issuing from the stream received; means of generating a transport stream from the multiplex generated, formed in bursts based on the IPE synchronisation signal generated, and means of constructing a megaframe within the transport stream generated by the insertion of megaframe initialisation packets based on the megaframe synchronisation signal generated.

The present invention also concerns a digital service contribution system characterised in that it comprises at least one device for generating a data stream of the first type and in that this stream is sent to at least one data stream generation device of the second type.

The present invention also concerns a data stream comprising a multiplex of services, in the form of a transport stream consisting of transport packets constructed from sections of the multiplex, said transport stream not being formed in bursts, said transport stream comprising megaframes formed by the insertion of special transport packets referred to as contribution multiplex synchronisation packets, comprising a pointer to the first packet of the following contribution megaframe and a time stamp, referred to as MCTS, relating to the moment of sending of the start of the following contribution megaframe; wherein said synchronisation packets of the contribution multiplex comprise a second and third time stamp for defining two periodic signals.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DESCRIPTION OF THE INVENTION

An example embodiment of the present invention will now be described.

This example embodiment is placed in the context of a service broadcast according to the DVB-H standard. However, a person skilled in the art will understand that it can apply in any digital service broadcasting system having similar features and that it is not strictly limited to the DVB-H system.

Figure 1:
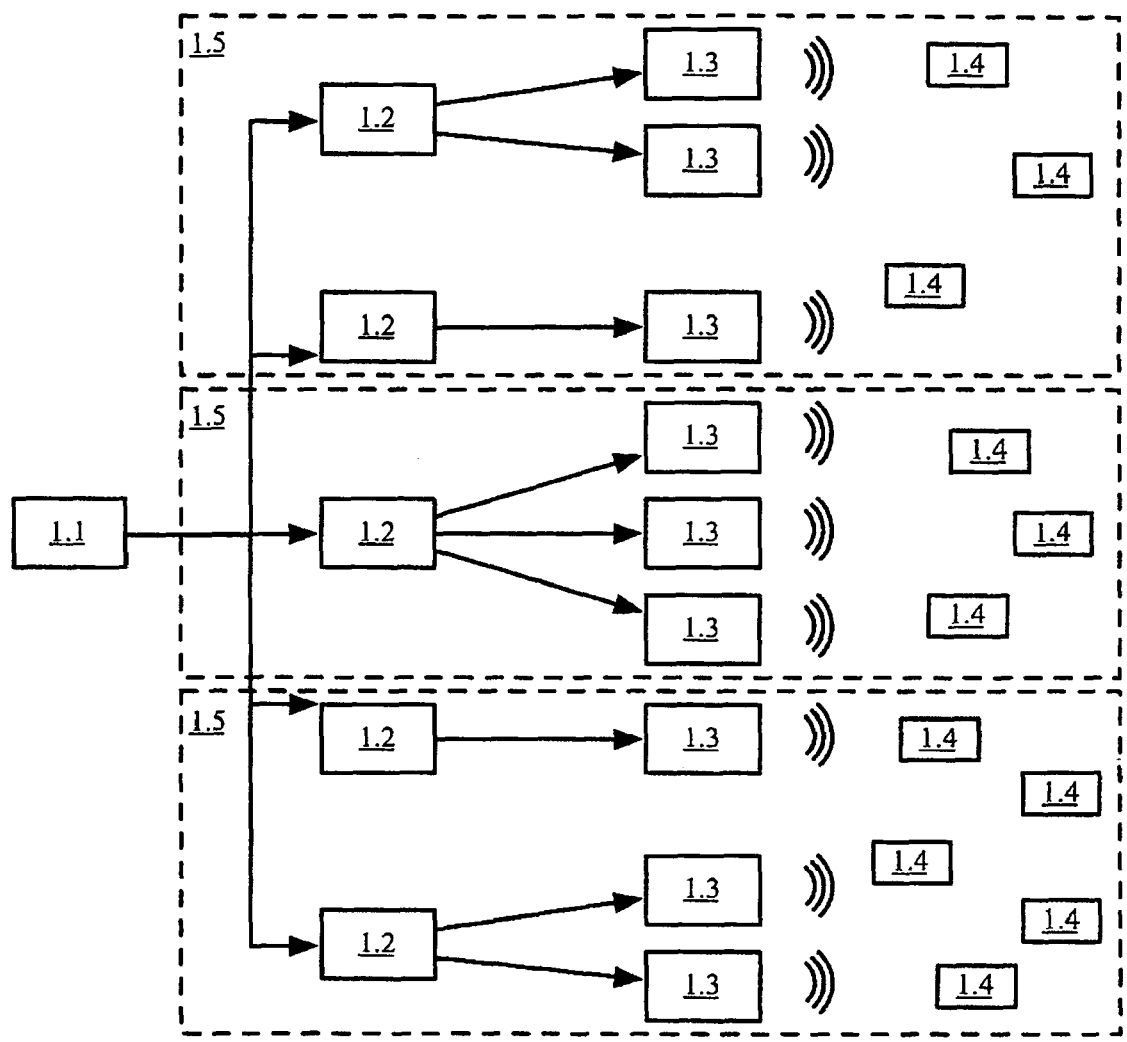
FIG. 1 shows the general architecture of the contribution system.

The general contribution architecture of the example embodiment of the invention is illustrated in FIG. 1. A source referenced 1.1 and called a concentrator sends a multiplexed data stream containing an offer of digital services. This service offer is intended for a territory, for example national, consisting of several regions. These regions are represented diagrammatically by the area surrounded in broken lines in FIG. 1 and referenced 1.5. Within each region a bunch of services issuing from the offer contained in the signal stream sent by the concentrator 1.1 will be broadcast. The services of the offer contained in the single stream and intended for all the regions 1.5 are called national services. These services of the offer contained in the single stream and intended for a single region, or for certain regions, are called regional services. The single stream transmitted by the concentrator therefore contains all the services intended for the regions covered. This stream is transmitted via a high-rate data communication network to a set of deconcentrators referenced 1.2 within the regions 1.5. The high-rate communication network is a satellite contribution link in the context of the example embodiment of the invention.

However, any other high-rate communication network can be envisaged such as an optical fibre network or the like. Each region 1.5 is covered by one or more of these deconcentrators 1.2. Each deconcentrator is responsible for constructing a stream called a regional stream, containing the services intended for this region and only for this, in accordance with the broadcasting standard of the DVB-H SFN type.

This regional stream therefore contains the national services plus the regional service relating to the region concerned. To do this, the deconcentrator filters the services concerned in the single stream received and constructs the adapted regional stream with these services. This stream, once constructed, is transmitted to one or more modulators referenced 1.3 responsible for broadcasting them by radio to the terminals of the users referenced 1.4.

A broadcast digital service comprises a set of elementary streams. It generally comprises one or more streams of the video type and one or more streams of the audio type. It can also comprises data streams or the like which may, for example, transport related data to the service in order to manage interactivity.

These elementary streams are transported by the IP protocol (Internet Protocol), the specification of which can be found in the document RFC 791 of the IETF (Internet Engineering Task Force). There is no restriction on the type of stream, the streams may be of the statistical multiplexing type.

These IP packets are then encapsulated according to the MPE protocol (Multi Protocol Encapsulation) defined in the document EN 301 192 of the ETSI (European Telecommunications Standards Institute). The packets making up the various elementary streams of the various services are multiplexed. For transportation, these MPE sections are chopped up and encapsulated in packets according to the format of the MPEG-2 (Moving Picture Experts Group) transport streams called TS packets. The appearance of each of these TS packets at a given stream is indicated by means of a program identifier PID (Program IDentifier) in the packet header. A set of signalling tables referred to as SI/PSI tables is also transmitted in the form of packets in the stream. These tables contain information on the services transmitted and enable the terminal to identify the streams associated with a given service and to know the PIDs thereof. The terminals can then filter the packets containing a service by means of the associated PIDs.

The DVB-H standard is intended for broadcasting for mobile terminals. Communication intended for mobile terminals is characterised by a noisy and variable radio channel. Moreover, mobile terminals generally function on batteries and the life thereof is an important criterion. For these reasons, DVB-H has standardised a burst broadcast mode and high protection against transmission errors in the form of an FEC (Forward Error Correction) error correcting code. This error correction correcting code protects the stream at the level of the sections and is different from the error correcting code added by the transport layer at the level of the TS packets, such as for example a concatenation of two BCH (Bose-Chaudhuri-Hocquenghem) and LDPC (Low Density Parity Check) codes in the case of the DVN-S2 standard. The first FEC error correcting code will be termed the "sections FEC" correcting code and the second the "TS FEC" correcting code.

Figure 4:
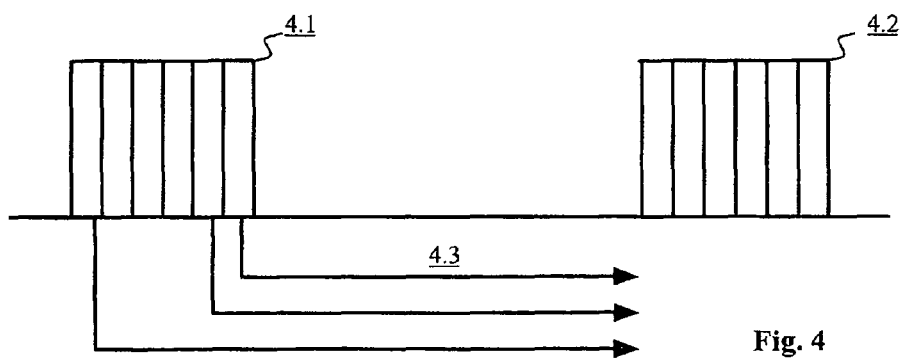
FIG. 4 shows the functioning of the broadcasting in bursts.

Burst mode consists of grouping the sections containing the data of a service by bursts in the data stream. In this way, a terminal wishing to receive a service can then disconnect its radio receiver between two bursts for reasons of energy saving. FIG. 4 illustrates a broadcast by bursts. A service consists of MPE data sections collected together by bursts.

A first burst is referenced 4.1. Each section of the first burst 4.1 contains in its header information on the time separating the sending of this section from the start of the sending of the following burst referenced 4.2. This information is called the delta-t, referenced 4.3, between the section and the first following burst. A data stream is said to be formed in bursts when the data are grouped together within the stream, for example the services, in entities with a view to sending thereof in bursts.

Figure 3:
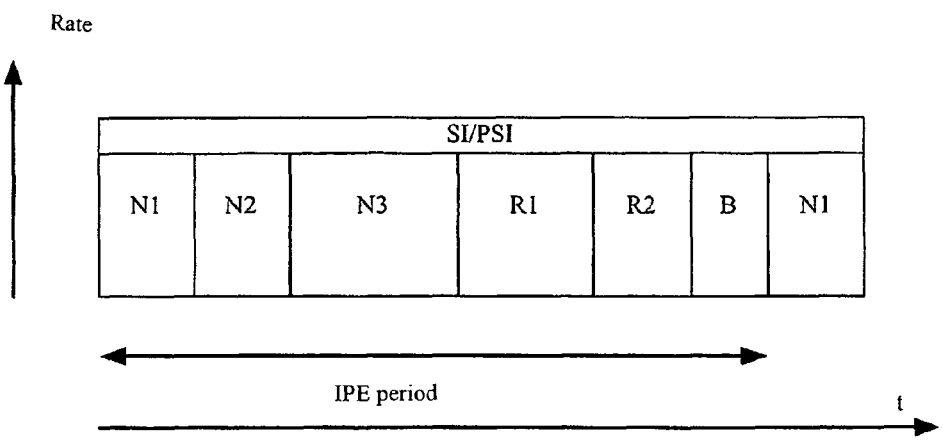
FIG. 3 shows the stream generated by the deconcentrator.

FIG. 3 for its part illustrates the regional stream as constructed by the deconcentrator. In FIG. 3, the regional stream contains three national services called N1, N2 and N3 as well as two regional streams R1 and R2. These streams are formed in bursts, that is to say the services, both national and regional, are grouped together in units that will be broadcast in the form of bursts. These units are visible in FIG. 3.

Each of these units corresponds to a set of transport packets having the same PID identifier, this identifier being different from one unit to another. The SI/PSI signalling tables, on the other hand, are not formed in bursts and broadcast thereof is continuous, their sections being multiplexed with those of the services within the bursts. The sending of the bursts of the various services is done periodically according to a period called the IPE (Internet Protocol Encapsulator) period. The IPE period having to correspond to an integer number of TS packets and being fixed, non-significant data, referred to as stuffing, denoted B in FIG. 1, are inserted as required in order to obtain a whole number of TS packets. For a given service, the mean duration of the burst and the IPE period are such that the mean rate of the broadcast is at least equal to the rate necessary for the real-time retrieval of the broadcast service. It should be noted that, within the IPE period of fixed duration, the duration of each burst corresponding to a given service may vary between the periods.

Within the same region, the services are broadcast on the same frequency. This is a so-called SFN (Single Frequency Network) broadcasting. So that such broadcasting can be operational it is important for the various modulators 1.3 of the region to be properly synchronised in order to guarantee good reception mainly in the borders of the coverage areas of each modulator. This synchronisation is guaranteed between the modulators transmitting a signal sent by the same transmitter, here a deconcentrator, by a mechanism described in the document "Digital Video Broadcasting (DVB); DVB mega-frame for Single Frequency Network (SFN) synchronisation", which can be found under the reference ETSI TS 101 191 v1.4.1.

Figure 5:
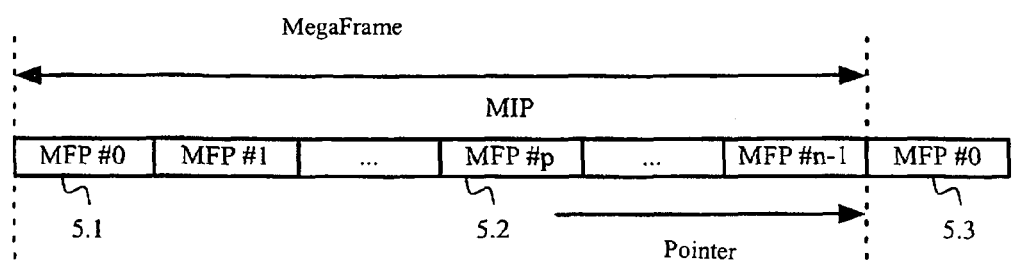
FIG. 5 shows the structure of a "megaframe" frame.

This mechanism is based on the sending of megaframes of TS packets. It is illustrated in FIG. 5. In this figure, the TS packets of the stream are numbered according to their place in the megaframe from the first MPF packet #0 referenced 5.1, to the MPF packet #n−1 referenced 5.3, where "n" is the number of TS packets in the megaframe. Within the megaframe, an initialisation packet, referenced 5.2, is introduced, this packet is called the MIP packet (Megaframe Initialisation Packet), which has a dedicated PID identifier. This MIP packet makes it possible to precisely identify the first packet of the following megaframe. It also has a time stamp indicating the difference between the last pip of a period clock, a reference second that precedes the start of the following megaframe and the actual start of this following megaframe. This time stamp is called STS (Synchronisation Time Stamp).

The reference clock is generally obtained by means of a GPS (Global Positioning System) receiver. The STS time stamp is expressed in steps of 100 ns.

The inventors have found that the contribution channel between the concentrator and the deconcentrators, that is to say, in the example embodiment, the satellite contribution channel, is much more robust than the radio channel between the modulators and the reception terminals. Because of this, the "sections FEC" error correction mechanism is not necessary for good transmission between the concentrator and the deconcentrator. It is therefore proposed that, preferentially but not necessarily, the single contribution stream not be protected by the "sections FEC" mechanism. Abandoning the protection by the "sections FEC" mechanism for the single stream affords a saving on bandwidth of around 25% according to the FEC parameters used. This is because these codes consist of the addition of redundant sections in addition to the data sections to enable wrongly data transmitted to be reconstructed.

In addition, it is not necessary to adopt a burst broadcast mode for the single stream. Consequently the single stream will advantageously be transmitted without being formed in bursts. Because of this, any non-significant stuffing data at the end of an IPE period are also saved on.

The single stream therefore consists of a multiplex of MPE sections containing the IP frames of the various services. This multiplexed stream of MPE sections is transported by a transport stream of the MPEG-2 TS (Transport Stream) type.

The services are not collected in bursts and the stream is not generally protected by a correcting mechanism of the "sections FEC" type.

On the other hand, the streams sent by the modulators must be standard streams able to be received by any terminal in accordance with the standard used, for example DVB-H in SFN network mode. Because of this, these streams must be broadcast in bursts and synchronised within the same region. Since each region may be covered by several deconcentrators, these must generate identical synchronised streams within the region. It is therefore necessary to synchronise all the deconcentrators in the same region with each other. Each deconcentrator must generate a stream that is to be broadcast in bursts, and it is therefore necessary for the deconcentrators in the same region to generate identical bursts in a synchronised fashion. To allow functioning of the regional network in SFN mode, it is also necessary for the TS stream generated by the deconcentrators to form megaframes and therefore to contain initialisation packets of the MIP type. These megaframes must be synchronised with the various deconcentrators in the same region.

The solution to these various synchronisation problems consists of sending in the single stream, at the concentrator, packets similar to the MIP-type packets. These packets are called Multiplex Contribution Synchronisation packets MCPS. These contain three different time stamps. A first time stamp, called MCTS (Multiplex Contribution Time Stamp), is dedicated to the synchronisation of the various deconcentrators with each other. A second time stamp, called ITS (IPE Time Stamp), is dedicated to the synchronisation of the IPE periods for generating bursts. The third time stamp, called MTS (MIP Time Stamp), is dedicated to the synchronisation of the megaframes produced by the deconcentrators.

Advantageously, these multiplex contribution synchronisation packets may also contain two sets of pointer and maximum delay parameters similar to those of the MIP packets as defined in EN 101 191. A first set associated with the MCTS stamp and a second set associated with the MTS stamp.

To do this, the concentrator of the example embodiment is provided with a GPS reception module that enables it to receive the GPS clock at steps of 1 second. It is also provided with a internal clock to a step of 100 ns generally synchronised by the GPS.

A person skilled in the art will understand that it is a case here of an example embodiment and that these clocks may come from other sources and function with different steps without departing from the scope of the invention. The single stream sent by the concentrator, which is an MPEG-2 TS stream, is sent in the form of megaframes according to the megaframe mechanism already described. We will speak here of contribution megaframe. This is because the period of this megaframe is defined by the concentrator and relates to the rate of the single stream, which will be referred to as the contribution rate. The period of this contribution megaframe must correspond to the time for sending a whole number of TS packets at the contribution rate of the single stream. Consequently an MCSP packet is introduced within each megaframe. This MCSP packet contains a time stamp corresponding to the STS stamp in the conventional megaframe mechanism. This stamp is the MCTS stamp of the invention. It will therefore serve to synchronise with each other the various deconcentrators receiving this single stream.

Figure 2:
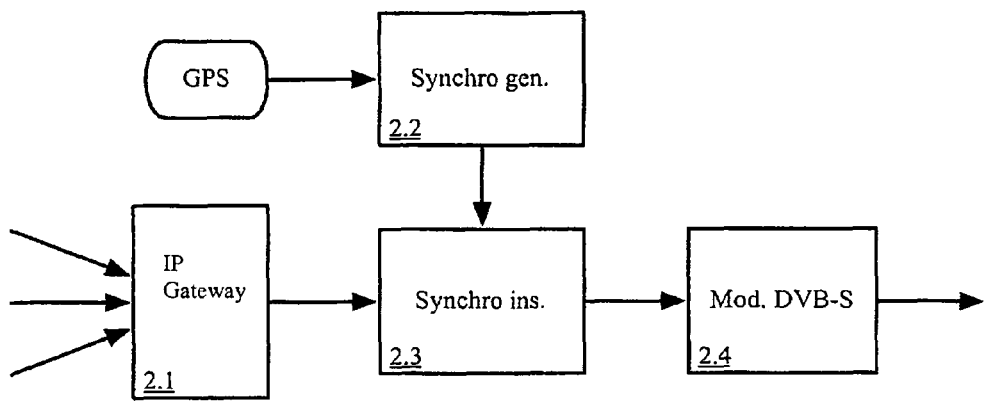
FIG. 2 shows the functional architecture of the concentrator.

This mechanism is illustrated in FIG. 2, which shows the functional architecture of the concentrator according to the example embodiment of the invention. This concentrator is provided with an IP gateway referenced 2.1. This gateway receives all the services that are to be broadcast in the form of an IP stream. The function of this gateway is to create the MPEG-2 TS stream. It therefore encapsulates the IP packets in MPE sections. It multiplexes, that is to say mingles, the MPE sections corresponding to the various services within a so-called multiplex stream. A supplementary service with a specific PID can be added, which contains information on configuration of the deconcentrators. This information may for example relate to the services to be filtered for each region, the period of the IPE, the configuration information to be inserted in the MIP packets of the broadcast megaframes. Once the multiplex of the MPE sections is obtained, it generates the TS packets from these sections. The concentrator is also provided with a synchronisation generation module comprising a GPS receiver referenced 2.2. This module therefore has a clock with a step of 1 second received by GPS. It also has a clock with a step of 100 ns that can also be supplied by the GPS or generated internally. This information is available for a synchronisation packet insertion module referenced 2.3. It is this insertion module 2.3 that forms the contribution megaframes. It creates the corresponding MCSP packets using the clocks available via the synchronisation generation module 2.2.

The single stream is then obtained in the form of an MPEG-2 TS stream transporting the multiplex of the MPE sections of the various services and the signalling tables in the form of a megaframe carrying an MCSP synchronisation packet. This stream is then modulated by the DVB-S modulator referenced 2.4 with a view to transmission thereof by satellite. This stream is not protected by an FEC error correcting mechanism for the sections and the services are not collected in bursts.

In addition to the first MCTS time stamp inserted in the MCSP packet by the concentrator, the latter will calculate and insert two other time stamps. The second is called ITS (IPE Time Stamp) and serves to define the IPE period that will be used by the deconcentrators for generating a stream in a burst transmission mode. The concentrator defines the IPE period and generates a periodic signal, called the IPE synchronisation signal, according to this period. The second time stamp ITS relates to this IPE synchronisation signal. It corresponds for example to the number of steps of the 100 ns step clock from the start of the current IPE period. The third time stamp, called MTS (Mega frame Time Stamp), serves to define the megaframes that will be generated by the deconcentrators in order to construct the regional streams. These megaframes must not be confused with the contribution megaframes. They will be referred to as broadcast megaframes. They must be in accordance with the standard, in this case the document EN 101 191 of the ETSI, and the duration thereof depends on the modulation parameters chosen.

The modulation rate of the regional stream is generally less than the contribution rate of the single stream. Here again, the concentrator generates a periodic signal, referred to as the megaframe synchronisation signal, the period of which corresponds to the duration of a broadcasting megaframe. This period, which must correspond to a whole number of TS packets, depends only on the broadcasting standard, such as for example a concatenation of an RS (Reed-Solomon) code and a convolutional code in the case of the DVB-H standard. This duration is a parameter fixed by the broadcasting standard. The third time stamp MTS relates to this megaframe synchronisation signal. For example, it corresponds to the number of steps of the 100 ns clock before the start of the next megaframe. The MCSP packet introduced into the single stream therefore comprises three time stamps, a first, MCTS, relating to the time of start of the following megaframe in the single stream, a second, ITS, relating to the IPE synchronisation signal and a third, MTS, relating to the megaframes synchronisation signal.

Figure 6:
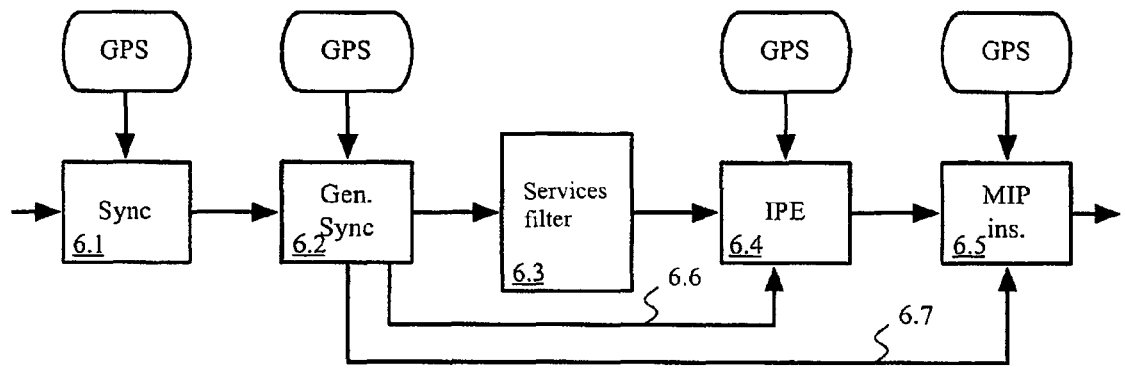
FIG. 6 shows the functional architecture of the deconcentrator.

This stream will be received by the deconcentrator. FIG. 6 illustrates the functional architecture of the deconcentrator according to the example embodiment of the invention. The stream received is demodulated and processed by a synchronisation module referenced 6.1. The deconcentrator is provided with a GPS receiver for receiving and distributing to the various modules that need it the 1-second step GPS clock. The deconcentrator also has an internal clock, synchronised to the GPS signal, to a step of 100 ns. By virtue of these clocks, the GPS clock is the same as the one used by the concentrator and, by virtue of the MCTS time stamp contained in the MCSP packets of the single stream received, this synchronisation module 6.1 is able to synchronise the deconcentrator. It is by virtue of this module that the various deconcentrators will be synchronised with each other. The stream received and synchronised by virtue of the synchronisation module 6.1 is transmitted to a synchronisation generation module 6.2. This module generates two synchronisation signals by means of the time stamps found in the MCSP packets of the single stream received. The first synchronisation signal, referenced 6.6 and called the IPE synchronisation signal, is a periodic signal the period of which is the IPE period as reconstructed from the second ITS time stamp of the MCSP packet. This IPE synchronisation signal 6.6 will therefore have the same period and be synchronous with the various deconcentrators because the latter are synchronised with each other by the synchronisation module 6.1. The second synchronisation signal, referenced 6.7 and called the MIP synchronisation signal, is a periodic signal the period of which is the duration of a broadcasting megaframe as reconstructed from the third time stamp PTS of the MCSP packet. This MIP synchronisation signal 6.7 will therefore have the same period and be synchronous with the various deconcentrators because the latter are synchronised with each other by the synchronisation module 6.1. The stream is then processed by a filter module for the services 6.3. This module is responsible for extracting, from the single stream, the services concerning the region served. This extraction is done mainly by means of a filter on the program identifiers, PID, of the packets. Advantageously, the deconcentrator is configured with a region identifier. It receives in the single stream specific tables indicating to it which are the services intended for this region. This module is also responsible, in a conventional fashion, for generating SI/PSI signalling tables corresponding to the services kept. The filter module for the services 6.3 also ensure the de-encapsulation MPE/TS in order to restore the initial IP frames.

The signal is then processed by an IP encapsulator 6.4 called IPE. The function of this IP is firstly to protect the stream by means of a section correcting code. This step is carried out in a conventional manner as described in the document ETSI EN 301 192 section 9.3. The Sections FEC are therefore added to the stream. Secondly, the transmission having to take place according to this burst mode, it is necessary to generate the data bursts for each service. The MPE sections corresponding to the services are grouped together in order to generate a stream of the type illustrated by FIG. 3. To do this, the IPE synchronisation signal 6.6 is used for fixing the IPE period. As required, stuffing data are added at the end of each IPE period. Because of the synchronisation between the deconcentrators, the use of the same ITS time stamps and the deterministic behaviour of the IPE, the IPE periods generated are perfectly identical and synchronous within the same region. The stream protected by the FEC section correcting code and put in the form of bursts is then transmitted to an MIP packet insertion module 6.5. The function of this MIP packet insertion module is to generate the broadcasting megaframes and to insert the corresponding MIP packets in the stream. This module uses the MIP synchronisation signal 6.7 to define the megaframes as well as the 1-second and 100 ns step clocks supplied by the GPS. Here also, because of the synchronisation of the deconcentrators and the use of the same MTS time stamps, the broadcasting megaframes generated are identical, at least within the same region, and synchronous.

It can therefore be seen that, by virtue of the three time stamps inserted in MCSP packets within the single stream and by virtue of the deterministic behaviour of the IPE, the deconcentrators are able to generate synchronous streams in burst mode sent within synchronous broadcasting megaframes. These streams are identical and synchronous within the same region. They are different between two different regions because the services selected are different.

The synchronisation between the streams generated by the deconcentrators is essential within a region functioning in SFN. It is on the other hand unnecessary between two different regions. According to an alternative embodiment, it is possible to manage sets of synchronisation parameters that are different for one or more regions. In practice, this amounts to generating at the concentrator several sets of IPE and megaframe synchronisation signals. For each contribution megaframe of the single data stream it is necessary to include in this case ITS and MTS time stamps for each of these sets of synchronisation parameters.

It is therefore possible to manage at the level of the concentrator several sets of MCSP packets, a packet of each set being introduced into each contribution megaframe of the single stream, constructed using IPE periods that are different in length or phase. It is likewise possible to use broadcasting megaframes that are different in length or phase. In this way, each region can use one of the sets of MCSP packets available in the single stream for constructing the regional stream. This makes it possible to manage regional streams the modulation rate of which differs from one region to another. The constraint is that the deconcentrators in the same region use the same set of MCSP packets for generating within the region synchronous flows having the same modulation rate. To do this, it is possible to add a region identifier to the MCSP packets inserted in the single stream. It is thus possible to manage the synchronisation of the different regions in different ways.

Alternatively, the ITS and MTS time stamps corresponding to each set of synchronisation parameters are introduced into each MCSP packet of each contribution megaframe.

The putting in the form of bursts being done by the deconcentrators, the method proposed makes it possible to add regional services at the concentrator as required. These additional services, not contained in the single stream, can be added during the construction of the regional stream by the IPE module. The input of these streams on each deconcentrator must then be synchronous within the region.

When a region is covered by several deconcentrators, these must generate a perfectly identical and synchronised stream. For this purpose, it is necessary to make the functioning of the generation of the streams deterministic. A deterministic IPE module or deterministic stream generation method is then spoken of in that the stream generated is sure to be perfectly identical between two concentrators of the same region. In particular, the IPE is made deterministic by an IPE period of fixed size and corresponding to an integer number of TS packets, a generation of bursts and a generation of PSI/SI tables that is particular and reinitialised at each IPE period.

The generation of the bursts by the IPE is made deterministic by putting the bursts in a deterministic order (for example by increasing PID) and supplementing the bursts formed for each service and therefore for each PID corresponding to data with supplementary stuffing data in order to achieve a TS packet size that is a multiple of 16. In this way it is ensured that the continuity counter for each PID identifier corresponding to data goes to zero again at the start of each IPE period. It is thus ensured that the values of this counter are identical for all the streams generated by the various deconcentrators.

The generation of the SI/PSI tables by the IPE is made deterministic in the following manner in order to ensure that the transport packets corresponding to the PSI/SI tables are identical and at the same positions for each IPE period. It is first of all ensured that an integer number of repetition cycles of each signalling table is included in each IPE period. The generation of the signalling tables is also reinitialized at the start of each IPE period. For each SI/PSI table, the transport packets are inserted at deterministic and constant positions within each IPE period. The IPE module also supplements the signalling information with stuffing data for each PID corresponding to PSI/SI tables in order to achieve a TS packet size that is a multiple of 16 within each IPE period. It is thus ensured that the sending of these tables goes to zero again at the start of each IPE period and that the continuity counter for each PID identifier corresponding to PSI/SI tables goes to zero again at the start of each IPE period.

These two features, when they are applied, enable the state of the IPE to be reinitialised at the start of each IPE period, both for generating the service bursts and for generating the signalling table sections. The IPE periods being of fixed size, these features ensure a known state of the IPE module at the start of each IPE period.

The regional stream thus obtained is then transmitted to the modulator or modulators for actual broadcasting thereof to the user terminals in the region.

The invention claimed is:

1. A method of generating a data stream, referred to as a contribution stream, comprising a multiplex of services, the method being executed by a concentrator and comprising:
    a step of generating by the concentrator a transport stream consisting of transport packets constructed from sections of the multiplex, said transport stream not being formed in bursts;
    a step of constructing by the concentrator megaframes within the transport stream, referred to as contribution megaframes, by inserting special so-called synchronisation transport packets for a contribution multiplex comprising a pointer to the first packet of the following contribution megaframe and a time stamp, called MCTS, relating to the moment of sending of the start of the following contribution megaframe;
    a step of generating by the concentrator a periodic signal called an IPE synchronisation signal, the period corresponding to the time of sending of an integer number of transport packets;
    a step of generating by the concentrator a periodic signal called the megaframe synchronisation signal;
    a step of inserting by the concentrator, in the synchronisation packets of the contribution multiplex, a second time stamp called ITS relating to the IPE synchronisation signal; and
    a step of inserting, by the concentrator in the synchronisation packets of the contribution multiplex, a third time stamp called MTS relating to the megaframe synchronisation signal.

2. The method according to claim 1, wherein the transport stream comprises a multiplex the sections of which are not protected by an error correcting code by adding redundant sections.

3. The method according to claim 1, wherein several sets of synchronisation parameters are defined, each set corresponding to an IPE synchronisation signal and to a given megaframe synchronisation signal, ITS and MTS time stamps corresponding to each set are introduced into the contribution megaframes of the stream generated.

4. The method according to claim 3, wherein the ITS and MTS time stamps corresponding to each set of synchronisation parameters are introduced in the form of synchronisation packets of the contribution multiplex that are different in each contribution megaframe of the stream generated.

5. The method according to claim 3, wherein the ITS and MTS time stamps corresponding to each set of synchronisation parameters are introduced within the same synchronisation packet of the contribution multiplex in each megaframe of the contribution stream generated.

6. A system of generating megaframes from a data stream, referred to as a contribution stream, comprising a multiplex of services and signalling tables, the system comprising:
    a concentrator arranged for generating a transport stream consisting of transport packets constructed from sections of the multiplex, said transport stream not being formed in bursts;
    the concentrator arranged for constructing megaframes within the transport stream, referred to as contribution megaframes, by inserting special so-called synchronisation transport packets for a contribution multiplex comprising a pointer to the first packet of the following contribution megaframe and a time stamp, called MCTS, relating to the moment of sending of the start of the following contribution megaframe;

the concentrator arranged for generating a periodic signal called an IPE synchronisation signal, the period corresponding to the time of sending of an integer number of transport packets;

the concentrator arranged for generating, aperiodic signal called a megaframe synchronisation signal;

the concentrator arranged for inserting in the synchronisation packets of the contribution multiplex, a second time stamp called ITS relating to the IPE synchronisation signal;

the concentrator arranged for inserting in the synchronisation packets of the contribution multiplex, a third time stamp called MTS relating to the megaframe synchronisation signal;

a deconcentrator arranged for receiving a stream generated according to claim 1;

the deconcentrator arranged for synchronizing from the first MCTS time stamp relating to the moment of sending the start of the following contribution megaframe included in the synchronisation packets of the contribution multiplex of the stream received;

a deconcentrator arranged for generating a periodic signal called an IPE synchronisation signal from the ITS time stamps included in the synchronisation packets of the contribution multiplex of the stream received;

a deconcentrator arranged for generating a periodic signal called a megaframe synchronisation signal from the MTS time stamps included in the synchronisation packets of the contribution multiplex of the stream received;

the deconcentrator arranged for generating a multiplex of services issuing from the stream received;

the deconcentrator arranged for generating a transport stream from the multiplex generated, formed in bursts based on the IPE synchronisation signal generated; and the deconcentrator arranged for constructing a megaframe within the transport stream generated by the insertion of megaframe initialisation packets based on the megaframe synchronisation signal generated.

7. A method of generating megaframes from a data stream, referred to as a contribution stream, comprising a multiplex of services and signalling tables, the method comprising:

a step of generating, by a concentrator, a transport stream consisting of transport packets constructed from sections of the multiplex, said transport stream not being formed in bursts;

a step of constructing, by the concentrator, megaframes within the transport stream, referred to as contribution megaframes, by inserting special so-called synchronisation transport packets for a contribution multiplex comprising a pointer to the first packet of the following contribution megaframe and a time stamp, called MCTS, relating to the moment of sending of the start of the following contribution megaframe;

a step of generating, by the concentrator, a periodic signal called an IPE synchronisation signal, the period corresponding to the time of sending of an integer number of transport packets;

a step of generating, by the concentrator, a periodic signal called the megaframe synchronisation signal;

a step of inserting, by the concentrator, in the synchronisation packets of the contribution multiplex, a second time stamp called ITS relating to the IPE synchronisation signal;

a step of inserting, by the concentrator, in the synchronisation packets of the contribution multiplex, a third time stamp called MTS relating to the megaframe synchronisation signal;

a step of receiving by a deconcentrator, the contribution stream;

a step of synchronisation, by the deconcentrator, from the first MCTS time stamp relating to the moment of transmission of the start of the following contribution megaframe of the stream received, included in the synchronisation packets of the contribution multiplex of the stream received;

a step of generating, by the deconcentrator, a periodic signal called an IPE synchronisation signal from the ITS time stamps included in the synchronisation packets of the contribution multiplex of the stream received;

a step of generating, by the deconcentrator, a periodic signal called the megaframe synchronisation signal from the MTS time stamps included in the synchronisation packets of the contribution multiplex of the stream received;

a step of generating, by the deconcentrator, a multiplex of services issuing from the stream received;

a step of generating, by the deconcentrator, a transport stream from the multiplex generated, formed in bursts, synchronised on the IPE synchronisation signal generated; and a step of constructing, by the deconcentrator, megaframes within the transport stream generated, referred to as broadcast megaframes, by the insertion of megaframe initialisation packets synchronised on the megaframe synchronisation signal generated.

8. The method according to claim 7, wherein the step of generating the multiplex includes a step, executed by the deconcentrator, of inserting a supplementary service not issuing from the stream received.

9. The method according to claim 7, wherein the method is made deterministic by the following steps:

the step of generating the IPE periods generates periods of fixed size;

the burst generation step generates bursts for each PID comprising a number of TS packets that is a multiple of 16 for each IPE period;

the burst generation step generates bursts ordered in a deterministic order for each IPE period within the transport stream;

the step of generating the SI/PSI tables of the transport stream generated comprises a number of TS packets that is a multiple of 16 for each PID and for each IPE period; and the method comprises a step, executed by the deconcentrator, of reinitialising the generation of the signalling tables at the start of each IPE period in order to ensure that the transport packets corresponding to the PSI/SI tables are identical and at the same positions for each IPE period.

10. The method according to claim 7, wherein it also comprises a step of protecting, by the deconcentrator, the multiplex generated by a redundancy error correcting code.

11. A device for generating a data stream comprising a multiplex of services, comprising:

a concentrator arranged for generating a transport stream consisting of transport packets constructed from sections of the multiplex, said transport stream not being formed in bursts;

the concentrator arranged for constructing megaframes within the transport stream, referred to as contribution megaframes, by inserting special transport packets for synchronisation of the contribution multiplex comprising a pointer to the first packet of the following contribution megaframe and a time stamp, called MCTS, relating to the moment of sending of the start of the following megaframe;

the concentrator arranged for generating a periodic signal called an IPE synchronisation signal, the period corresponding to the time taken for sending an integer number of transport packets;

the concentrator arranged for generating a periodic signal called a megaframe synchronisation signal;

the concentrator arranged for inserting, in the synchronisation packets of the contribution multiplex, a second time stamp called ITS relating the IPE synchronisation signal; and the concentrator arranged for inserting, in the synchronisation packets of the contribution multiplex, a third time stamp called MTS relating to the megaframe synchronisation signal.

* * * * *